(12) United States Patent
Lai

(10) Patent No.: US 12,194,328 B2
(45) Date of Patent: Jan. 14, 2025

(54) FIRE-PROTECTION SYSTEM AND METHOD FOR CONTAINER-TYPE ENERGY STORAGE DEVICE AND STORAGE MEDIUM

(71) Applicant: XIAMEN HITHIUM ENERGY STORAGE TECHNOLOGY CO., LTD., Fujian (CN)

(72) Inventor: Jiepeng Lai, Fujian (CN)

(73) Assignee: XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 18/384,620

(22) Filed: Oct. 27, 2023

(65) Prior Publication Data

US 2024/0139563 A1 May 2, 2024

(30) Foreign Application Priority Data

Oct. 28, 2022 (CN) .......................... 202211337143.2

(51) Int. Cl.
*A62C 3/16* (2006.01)
*A62C 3/06* (2006.01)
(Continued)

(52) U.S. Cl.
CPC .................. *A62C 3/16* (2013.01); *A62C 3/06* (2013.01); *A62C 37/36* (2013.01); *A62C 37/40* (2013.01);
(Continued)

(58) Field of Classification Search
None
See application file for complete search history.

(56) References Cited

U.S. PATENT DOCUMENTS 5,740,033 A * 4/1998 Wassick ............... G05B 13/048
700/29
8,140,775 B1 3/2012 Chatterjee et al.
(Continued)

FOREIGN PATENT DOCUMENTS

CN 103354759 A 10/2013
CN 205541250 U 8/2016
(Continued)

OTHER PUBLICATIONS

Wang et al, "Thermal runaway caused fire and explosion of lithium ion battery", 2012, Journal of Power Sources 208, pp. 212-221 (Year: 2012).*

(Continued)

*Primary Examiner* — David Earl Ogg
(74) *Attorney, Agent, or Firm* — Scully, Scott, Murphy & Presser, P.C.

(57) ABSTRACT

A fire-protection system and a method for a container-type energy storage device and a storage medium are provided. The system includes at least one detector module, a data prediction apparatus and a fire-protection host of the container-type energy storage device, and the data prediction apparatus is communicatively connected to the at least one detector module and the fire-protection host of the container-type energy storage device, respectively. The current detection data of the detector can be predicted by using the historical detection data in the event of an abnormal communication link between the detector module and the fire-protection host of the container-type energy storage device. The detection data can be sent to the fire-protection host to ensure that data can be continuously provided to the fire-protection host.

15 Claims, 4 Drawing Sheets

(51) Int. Cl.
  *A62C 37/36* (2006.01)
  *A62C 37/40* (2006.01)
  *G05B 23/02* (2006.01)
(52) U.S. Cl.
  CPC ..... *G05B 23/0221* (2013.01); *G05B 23/0235* (2013.01)

(56) References Cited

U.S. PATENT DOCUMENTS

| | | |
|---|---|---|
| 2015/0041158 A1 | 2/2015 | Stumm et al. |
| 2015/0120223 A1 | 4/2015 | Dannecker et al. |
| 2022/0308568 A1 | 9/2022 | Oh et al. |

FOREIGN PATENT DOCUMENTS

| | | | | |
|---|---|---|---|---|
| CN | 110046837 A | | 7/2019 | |
| CN | 109432634 B | * | 8/2020 | ............... A62C 3/16 |
| CN | 113096343 A | * | 7/2021 | ............... A62C 3/07 |
| CN | 113780675 A | | 12/2021 | |
| CN | 113807001 A | | 12/2021 | |
| CN | 114021861 A | | 2/2022 | |
| CN | 114267907 A | | 4/2022 | |
| CN | 114783133 A | * | 7/2022 | |
| CN | 114913659 A | | 8/2022 | |
| CN | 115671616 A | | 2/2023 | |
| KR | 102045489 B1 | * | 11/2019 | |
| WO | WO-2022030041 A1 | * | 2/2022 | |
| WO | WO-2022048168 A1 | * | 3/2022 | .......... G06F 11/3006 |
| WO | 2022102812 A1 | | 5/2022 | |

OTHER PUBLICATIONS

Chinese First Office Action dated Apr. 23, 2023 issued in CN 202211337143.2.
International Search Report dated Nov. 20, 2023 received in International Application No. PCT/CN2023/118591.
Extended European Search Report dated Apr. 16, 2024 received in European Patent Application No. EP 23206620.9.

* cited by examiner

FIRE-PROTECTION SYSTEM AND METHOD FOR CONTAINER-TYPE ENERGY STORAGE DEVICE AND STORAGE MEDIUM

CROSS-REFERENCE TO RELATED APPLICATION

The present application is based upon and claims the benefit of priority to Chinese Patent Application No. 202211337143.2, filed on Oct. 28, 2022, the entire contents of which are incorporated herein by reference for all purposes.

TECHNICAL FIELD

The present application relates to the technical field of fire-protection for energy storage, and in particular, to a fire-protection system and method for a container-type energy storage device and a storage medium.

BACKGROUND

With the development of new energy, the energy storage technology has been widely used in the field of new energy, in which the performance of electrochemical energy storage (battery energy storage) is particularly active. Fire-protection for energy storage is a key link in battery energy storage, and effective fire-protection measures cannot be separated from reliable communication between the fire-protection host and the sensors.

SUMMARY

Embodiments of the present application provide a fire-protection system and method for a container-type energy storage device and a storage medium.

In a first aspect, an embodiment of the present application provides a fire-protection system for a container-type energy storage device, where the system includes at least one detector module, a data prediction apparatus and a fire-protection host of the container-type energy storage device, and the data prediction apparatus is communicatively connected to the at least one detector module and the fire-protection host of the container-type energy storage device, respectively;

the at least one detector module is configured to separately detect one or more of temperature, humidity, smoke, combustible gas, water immersion, and lithium ion particles for each of a plurality of battery clusters in the container-type energy storage device, and to periodically report detection data;

the data prediction apparatus is configured to periodically read the detection data sent by the at least one detector module, and to send the read detection data to the fire-protection host of the container-type energy storage device in each cycle;

in response to that no detection data is read in an i-th cycle, the data prediction apparatus is configured to obtain a cycle prediction error of a prediction model for each detector module of the at least one detector module based on actual detection data and model prediction data from an (i–k)-th cycle to an (i–1)-th cycle, where i is greater than 2, k is greater than 1 and less than i; and the data prediction apparatus is configured to obtain model prediction data of the i-th cycle through the prediction model by using the actual detection data from the (i–k)-th cycle to the (i–1)-th cycle, obtain detection data of the i-th cycle based on the model prediction data of the i-th cycle and the cycle prediction error, and send the detection data of the i-th cycle to the fire-protection host of the container-type energy storage device; and the fire-protection host of the container-type energy storage device is configured to periodically read the detection data sent by the data prediction apparatus and analyze the detection data from the (i–k)-th cycle to the i-th cycle to determine whether a potential thermal runaway exists in battery packs in the plurality of battery clusters, and in response to the existence of the thermal runaway, to execute a predetermined fire-protection strategy.

In a second aspect, an embodiment of the present application provides a fire-protection method for a container-type energy storage device, applied to a fire-protection system, where the system includes at least one detector module, a data prediction apparatus and a fire-protection host of the container-type energy storage device, and the data prediction apparatus is communicatively connected to the at least one detector module and the fire-protection host of the container-type energy storage device, respectively, and the method includes:

separately detecting one or more of temperature, humidity, smoke, combustible gas, water immersion, and lithium ion particles for each of a plurality of battery clusters in the container-type energy storage device, and periodically reporting detection data, by the at least one detector module;

periodically reading the detection data sent by the at least one detector module, and sending the read detection data to the fire-protection host of the container-type energy storage device in each cycle, by the data prediction apparatus;

in response to that no detection data is read in an i-th cycle, obtaining a cycle prediction error of a prediction model for each detector module of the at least one detector module based on actual detection data and model prediction data from an (i–k)-th cycle to an (i–1)-th cycle by the data prediction apparatus, where i is greater than 2, k is greater than 1 and less than i; and obtaining model prediction data of i-th cycle through the prediction model by using the actual detection data from the (i–k)-th cycle to the (i–1)-th cycle, obtaining detection data of the i-th cycle based on the model prediction data of the i-th cycle and the cycle prediction error, and sending the detection data of the i-th cycle to the fire-protection host of the container-type energy storage device, by the data prediction apparatus; and periodically reading the detection data sent by the data prediction apparatus and analyzing the detection data from the (i–k)-th cycle to the i-th cycle to determine whether a potential thermal runaway exists in battery packs in the plurality of battery clusters, and in response to the existence of the thermal runaway, executing a predetermined fire-protection strategy, by the fire-protection host of the container-type energy storage device.

In a third aspect, an embodiment of the present application provides a computer-readable storage medium, where the computer-readable storage medium stores a computer program executable by a device, and implements the method in any embodiment of the above second aspect when the computer program is executed.

In a fourth aspect, an embodiment of the present application provides a computer program product. When the computer program product is run by a device, the device executes the method in any embodiment of the above second aspect.

BRIEF DESCRIPTION OF THE DRAWINGS

In order to more clearly illustrate the technical solutions in the embodiments or the background of the present application, the accompanying drawings to be used in the embodiments or the background of the present application are described below.

DETAILED DESCRIPTION

The terms "first", "second", "third" and "fourth", etc. in the specification, claims and accompanying drawings of the present application are used to distinguish different objects, rather than to describe a specific sequence. Furthermore, the terms "including" and "having" and any variations thereof are intended to cover non-exclusive inclusion. For example, processes, methods, systems, products or devices that include a series of steps or units are not limited to the listed steps or units, but optionally also include steps or units that are not listed, or optionally also include other steps or units inherent to such processes, methods, products or devices.

Reference herein to "an embodiment" means that a particular feature, structure or characteristic described in connection with the embodiment may be included in at least one embodiment of the present application. The appearances of this phrase at various locations in the specification do not necessarily refer to the same embodiment, nor are they separate or alternative embodiments that are mutually exclusive of other embodiments. Those skilled in the art understand, both explicitly and implicitly, that the embodiments described herein may be combined with other embodiments.

The terms "component", "module", "system", etc. used in this specification are used to denote computer-related entities, hardware, firmware, a combination of hardware and software, software, or software in execution. For example, a component may be, but is not limited to, a process running on a processor, a processor, an object, an executable file, a thread of execution, a program and/or a computer. By way of illustration, both the application running on the terminal device and the terminal device may be components. One or more components may reside in a process and/or thread of execution, and components may be located on a single computer and/or distributed between two or more computers. In addition, these components may be executed from a variety of computer-readable medium having various data structures stored thereon. For example, the components may communicate through local and/or remote processes according to signals having one or more data packets (e.g. data from two components that interact with a local system, a distributed system, and/or another component across a network, such as the Internet that interacts with other systems via signals).

In order to facilitate understanding of the embodiments of the present application and to further analyze and propose the technical problems specifically to be solved by the present application, the relevant technical solutions of the present application are briefly introduced below.

Figure 1:
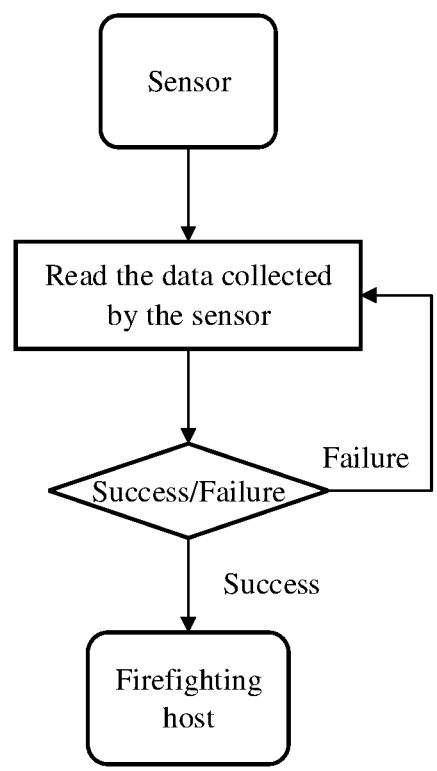
FIG. 1 is a schematic diagram of fire-protection communication in battery energy storage provided by an embodiment of the present application.

FIG. 1 is a schematic diagram of fire-protection communication in battery energy storage proposed by related art. As shown in FIG. 1, in the related art, the fire-protection host is directly connected to the sensors, and the fire-protection host periodically reads the data collected by the sensor and analyzes the data to determine whether a fire-protection measure needs to be taken. That is, the fire-protection host needs to read the data collected by the sensors in each cycle as a basis for action. It should be understood that communication link abnormality is a common problem in the field of communication. If the communication link between the fire-protection host and the sensor is abnormal, the fire-protection host fails to read the data, and then an abnormality alarm of the communication link will be triggered, which requires maintenance personnel to carry out link maintenance. In the case that the data collected by the sensor cannot be read, the fire-protection host is not able to know the status of the battery packs in the container-type energy storage device, and will not take any action. If the communication link abnormality occurs at a stage during which the temperature of the battery packs rises sharply, the fire-protection host does not take any fire-protection measure, and it takes some time for maintenance personnel to arrive at the maintenance location to carry out repairs, the battery packs may have already undergone thermal runaway.

In the conventional communication mode, once an abnormality occurs in sensor communication, an abnormal alarm is often used to prompt the staff to carry out manual maintenance. Due to the processing time delay, the possibility of thermal runaway increases, which brings certain fire safety issues.

Taking into account the defects and shortcomings of related art, the technical problem to be solved by the embodiments of the present application is mainly as follows: how to ensure that the fire-protection host can continuously read data to carry out corresponding fire-protection strategy during the stage when the temperature of the battery pack rises sharply, so as to avoid the occurrence of thermal runaway of lithium batteries.

The embodiments of the present application provide a fire-protection system and method for a container-type energy storage device and a storage medium, which can predict the current detection data of the detector by using the historical detection data in the event of an abnormal communication link between the detector module and the fire-protection host of the container-type energy storage device, and send the detection data to the fire-protection host to ensure that data can be continuously provided to the fire-protection host, thereby improving the reliability of fire-protection communication and effectively avoiding the occurrence of thermal runaway.

Figure 2A:
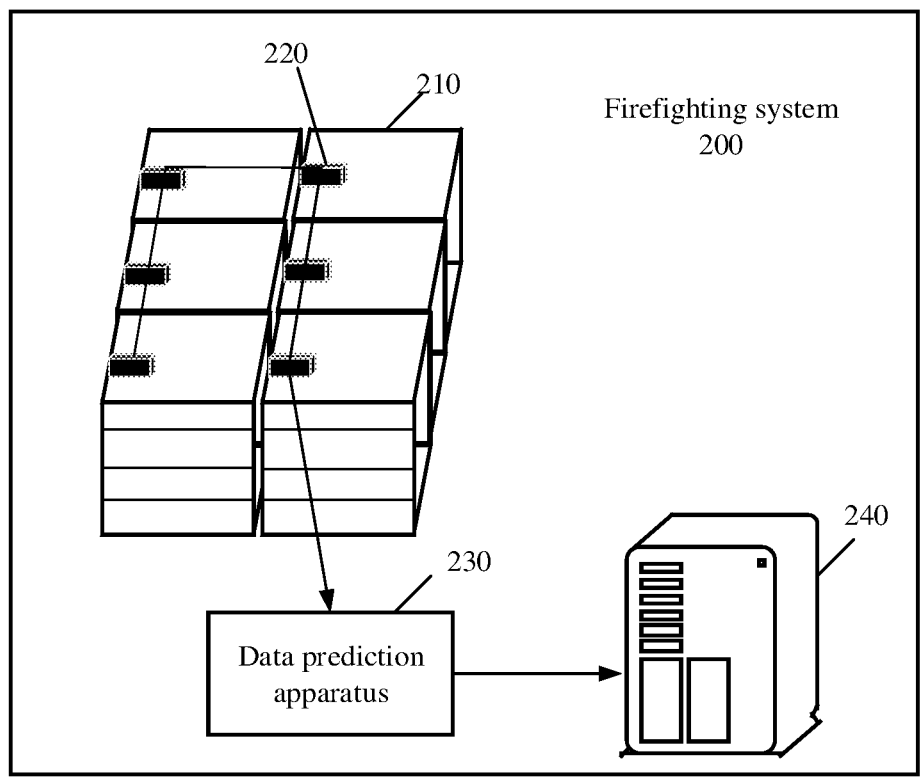
FIG. 2A is a schematic diagram of a fire-protection system for a container-type energy storage device provided by an embodiment of the present application.
Figure 2B:
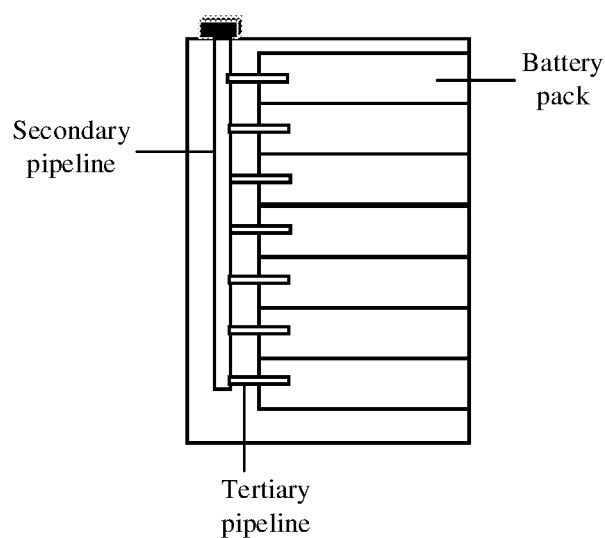
FIG. 2B is a schematic diagram of pipeline connections in a battery cluster provided by an embodiment of the present application.

Based on the above technical problems, please refer to FIG. 2A, which is a schematic diagram of a fire-protection system for a container-type energy storage device provided by an embodiment of the present application. As shown in FIG. 2A, the fire-protection system 200 at least includes a plurality of battery clusters 210 in the container-type energy storage device, at least one detector module 220, a data prediction apparatus 230 and a fire-protection host of the container-type energy storage device 240, where the at least one detector module 220 corresponds one-to-one to the plurality of battery clusters 210, and each of the detector module 220 is mounted on the top of the battery cluster 210. Each detector module 220 may be a sensor group including an independent temperature sensor, gas sensor, smoke sensor, etc., or may be a composite sensor capable of detecting all parameters (temperature, humidity, smoke, combustible gas, water immersion, lithium ionic particles), or may be a combination of two detectors of different detection types, i.e., a first composite detector (temperature, humidity) and a second composite detector (smoke, combustible gas), and the like. The data prediction apparatus 230 is communicatively connected to the at least one detector module 220 and the fire-protection host of the container-type energy storage device 240, respectively. The data prediction apparatus 230 may be embedded in the communication link between the at least one detector module 220 and the fire-protection host of the container-type energy storage device 240 in a manner of black box, where the black box refers to a black case, which refers to a system or device that only knows the input-output relationship but not the internal structure. The at least one detector module 220 is only aware that it periodically sends detection data and is unaware of the presence of the data prediction apparatus 230 on the communication link. That is, the original communication mode between the at least one detector module 220 and the fire-protection host of the container-type energy storage device 240 is unaffected in the case that the communication is normal. Each battery cluster 210 stores a same number of battery packs, and each battery pack is provided with a built-in nozzle, as shown in FIG. 2B, the detector module 220 is connected to a secondary pipeline with an outer diameter of 12 mm, and a tertiary pipeline with an outer diameter of 8 mm is connected to the secondary line at one end and to the battery pack at the other end.

The at least one detector module 220 is configured to separately detect one or more of temperature, humidity, smoke, combustible gas, water immersion, and lithium ion particles for each of a plurality of battery clusters 210 in the container-type energy storage device, and to periodically report detection data. Exemplarily, the detection data of each detector module 220 may be represented as a vector X, $X=[x_1, x_2, x_3, x_4, x_5, x_6]$, where $x_1$ represents temperature data, $x_2$ represents humidity data, $x_3$ represents smoke concentration data, $x_4$ represents combustible gas data, $x_5$ represents water immersion data, and $x_6$ represents lithium ion particles data.

The data prediction apparatus 230 is configured to periodically read the detection data sent by the at least one detector module 220, and to send the read detection data to the fire-protection host of the container-type energy storage device 240 in each cycle. The data prediction apparatus 230 obtains the model prediction data of each cycle through a prediction module by using actual detection data of a plurality of historical cycles of each cycle. For example, if the current cycle is the 5th cycle, then the plurality of historical cycles may be from the 1st cycle to the 4th cycle, or from the 2nd cycle to the 4th cycle, etc. Based on the actual detection data of the plurality of historical cycles, one or more of the temperature, humidity, smoke, combustible gas, water immersion, and lithium ion particles data of the 5th cycle is predicted by the prediction model, i.e., the model prediction data of the 5th cycle is obtained.

Figure 3:
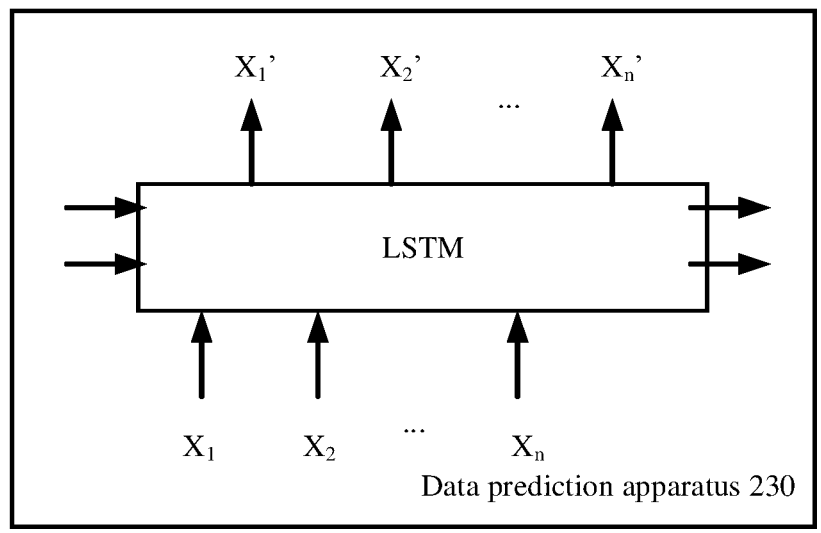
FIG. 3 is a schematic diagram of a prediction model in a data prediction apparatus provided by an embodiment of the present application.

Exemplarily, as shown in FIG. 3, the prediction model may be a trained long short term memory (LSTM) model. Assuming that the current cycle has n historical cycles, $[X_1, X_2, \ldots, X_n]$ is then used as the input vector of the LSTM model at each moment to obtain the hidden state $[X_1', X_2', \ldots, X_n']$ of each historical cycle, i.e., the prediction value of each historical cycle is denoted as: X', and the model prediction data of the current cycle is obtained by calculating the average value of the temperature, humidity, smoke, combustible gas, water immersion, and lithium ion particles in X' separately. Optionally, a Transformer encoder is used to encode $[X_1, X_2, \ldots, X_n]$ before inputting $[X_1, X_2, \ldots, X_n]$ to obtain an attention matrix, and the attention matrix is used as a weight matrix $[W_{fx}, W_{ix}, W_{cx}, W_{ox}]$ of each gate in the untrained LSTM network to accelerate the learning progress of the network for the prediction of detection data.

In this implementation manner, in each cycle, the data prediction apparatus 230 obtains the model prediction data of this cycle through the prediction model by using the actual detection data of the plurality of historical cycles of this cycle, compares the model prediction data with the actual detection data of this cycle to analyze the error, and corrects the prediction model, which is conducive to analyzing the prediction error by using the model prediction data, and is conducive to updating the weight parameter and bias parameter, etc. of the prediction model in each cycle, so as to improve the prediction accuracy of the prediction model in the next cycle.

In response to that no detection data is read in an i-th cycle, the data prediction apparatus 230 is further configured to obtain a cumulative prediction error of a prediction model for each detector module 220 of the at least one detector module 220 based on actual detection data $X_j$ and model prediction data $X_j'$ in each cycle from an (i−k)-th cycle to an (i−1)-th cycle, where i is greater than 2, k is greater than 1 and less than i, and j is greater than or equal to i−k and less than or equal to i−1. Specifically, the i-th cycle may be the current cycle. If no detection data is read in the i-th cycle, the data prediction apparatus 230 determines that an abnormality has occurred in the communication link, and then the prediction error of the prediction model for each detector module 220 of each cycle from the (i−k)-th cycle to the (i−1)-th cycle is obtained according to the actual detection data of each detector module 220 in each cycle from the (i−k)-th cycle to the (i−1)-th cycle and the model prediction data. For example, the prediction error of the j-th cycle is $X_j'-X_j$, and the prediction errors for each cycle from the (i−k)-th cycle to the (i−1)-th cycle are summed to obtain the cumulative prediction error of the prediction model for each detector module 220, which is shown as the following formula (1):

$$\Sigma_{j=i-k}^{i-1} X_j' - X_j \qquad (1)$$

where $X_j'$ represents the model prediction data of the j-th cycle, $X_j$ represents the actual detection data of the j-th cycle, i is an integer greater than 2, k is an integer greater than 1 and less than i, and j is an integer greater than or equal to i−k and less than or equal to i−1.

In this implementation manner, the data prediction apparatus 230 calculates the cumulative prediction error of the prediction model for each detector model 220 through the actual detection data and the model prediction data in each cycle from the (i−k)-th cycle to the (i−1)-th cycle, which is conducive to obtaining a unit time prediction error of the prediction model for each detector module 220 subsequently, and the unit time prediction error is used to correct the prediction value of the prediction model to improve the accuracy of the detection data reported by the data prediction apparatus 230 in the i-th cycle.

The data prediction apparatus 230 is further configured to obtain a cumulative reporting time error of each detector module 220 based on moments when the actual detection data is read from the (i−k)-th cycle to the (i−1)-th cycle. Specifically, as the service cycle of the detector module 220 increases, there may be a certain amount of error in the detection accuracy, detection time, and reporting time thereof (since the difference between the detection time and the reporting time is small, the difference is usually negligible, i.e., the reporting time may also be used as the detection time in the embodiments of the present application). For example, an initial reporting time cycle of the detector module 220 is once every 10 seconds, and with the accumulation of errors, the reporting time cycle may increase to once every 15 seconds. For every two adjacent cycles from the (i−k)-th cycle to the (i−1)-th cycle, the data prediction apparatus 230 calculates and obtains a time difference $\Delta T$ of every two adjacent cycles based on the moment $T_j$ at which the actual detection data of every two adjacent cycles is read. Then, the reporting time error of each detector module 220 in every two adjacent cycles may be represented as $\Delta T - T'$, where $T'$ represents a preset duration of cycle interval (e.g., 10 seconds, 20 seconds, etc.). The data prediction apparatus 230 obtains a cumulative reporting time error based on the reporting time error $\Delta T - T'$ of each detector module 220 in every two adjacent cycles, which is shown as the following formula (2):

$$\sum_{m=1}^{i-2} \Delta T - T' \quad (2);$$

where m represents an interval number from the (i−k)-th cycle to the (i−1)-th cycle. For example, m=1 indicates the interval between the 1st cycle and the 2nd cycle, m=2 indicates the interval between the 2nd cycle and the 3rd cycle, and so on, i is an integer greater than 2, $\Delta T$ represents the time difference between every two adjacent cycles, and $T'$ represents the preset duration of cycle interval.

The data prediction apparatus 230 is further configured to obtain a cycle prediction error of the prediction model for each detector module 220 based on the cumulative prediction error and the cumulative reporting time error. Specifically, with the increase of the service cycle, there may be a certain error in the reporting time of the detector module 220 in each cycle. Therefore, the data prediction apparatus 230 considers that the reporting time error of the detector module 220 leads to the error of the actual detection data reported by the detector module 220. The model prediction data of each cycle needs to be predicted according to the actual detection data of the historical cycles. The data prediction apparatus 230 further considers that the prediction error of each cycle is related to the accuracy of the actual detection data, and the accuracy of the actual detection data of each cycle is related to the reporting time error of the detector module 220. Therefore, the unit time prediction error of the prediction model for each detector module may be calculated by using the cumulative prediction error and the cumulative reporting time error, which may be represented as the following formula (3):

$$\frac{\sum_{j=i-k}^{i-1} X_j' - X_j}{\sum_{m=1}^{i-2} \Delta T - T'}, \quad (3)$$

where the unit of the unit time prediction error is the amount of error per second, where $X_j'$ represents the model prediction data of the j-th cycle, $X_j$ represents the actual detection data of the j-th cycle, i is an integer greater than 2, k is an integer greater than 1 and less than i, and j is an integer greater than or equal to i−k and less than or equal to i−1, m represents an interval number from the (i−k)-th cycle to the (i−1)-th cycle, $\Delta T$ represents the time difference between every two adjacent cycles, and $T'$ represents the preset duration of cycle interval.

The data prediction apparatus 230 is configured to obtain the cycle prediction error based on the unit time prediction error and the preset duration of cycle interval $T'$, which may be represented as the following formula (4):

$$\text{ERROR} = \frac{\sum_{j=i-k}^{i-1} X_j' - X_j}{\sum_{m=1}^{i-2} \Delta T - T'} \times \frac{\sum_{m=1}^{i-2} \Delta T - T'}{i-2} = \frac{\sum_{j=i-k}^{i-1} X_j' - X_j}{i-2}; \quad (4)$$

where the ERROR represents the cycle prediction error of the prediction model for each detector module 220, $X_j'$ represents the model prediction data of the j-th cycle, $X_j$ represents the actual detection data of the j-th cycle, i is an integer greater than 2, k is an integer greater than 1 and less than i, and j is an integer greater than or equal to i−k and less than or equal to i−1, m represents an interval number from the (i−k)-th cycle to the (i−1)-th cycle, $\Delta T$ represents the time difference between every two adjacent cycles, and $T'$ represents the preset duration of cycle interval. It should be noted that the data prediction apparatus 230 does not read the detection data in the i-th cycle, and is unable to obtain the time difference $\Delta T$ between the (i−1)-th cycle and the i-th cycle, and thus could not calculate the reporting time error of the i-th cycle. Therefore, the average reporting time error from the (i−k)-th cycle to the (i−1)-th cycle $$\frac{\sum_{m=1}^{i-2} \Delta T - T'}{i-2}$$

is used as the reporting time error of the i-th cycle.

In this implementation manner, the data prediction apparatus 230 obtains the reporting time error of each detector module 220 in every two adjacent cycles based on the moments when the actual detection data of every two adjacent cycles is read, and then calculates the cumulative reporting time error of each detector module 220 from the (i−k)-th cycle to the (i−1)-th cycle, which is conductive to obtaining the unit time prediction error of the prediction model for each detector module 220 subsequently by using the above cumulative reporting time error and the above cumulative prediction error. And the cycle prediction error of the prediction model for each detector module 220 in the i-th cycle is obtained by using the unit time prediction error and the duration of cycle interval, and then the subsequent model prediction data is corrected by using the cycle prediction error.

The data prediction apparatus 230 is further configured to obtain the model prediction data of the i-th cycle through the prediction model by using the actual detection data from the (i−k)-th cycle to the (i−1)-th cycle. Specifically, the data prediction apparatus 230 organizes the actual detection data from the (i−k)-th cycle to the (i−1)-th cycle into the input vector $[X_1, X_2, \ldots, X_{i-1}]$ of each cycle of the LSTM model, predicts the hidden state $[X_1', X_2', \ldots, X_{i-1}']$ of each cycle through the LSTM model, calculates the average value of temperature, humidity, smoke, combustible gas, water immersion, and lithium ion particles in the (i−1)-th X' respectively, and then obtains the model prediction data of the i-th cycle. The data prediction apparatus 230 is further configured to obtain the detection data $X_i$ of the i-th cycle based on the model prediction data $X_i'$ of the i-th cycle and the cycle prediction error ERROR, and to send the detection data $X_i$ of the i-th cycle to the fire-protection host of the container-type energy storage device, where the detection data $X_i$ of the i-th cycle may be represented as the following formula (5):

$$X_i = X_i' - \text{ERROR} \tag{5}$$

where $X_i$ represents the detection data of the i-th cycle, $X_i'$ represents the model prediction data of the i-th cycle, ERROR represents the cycle prediction error of the prediction model for each detector module 220.

Optionally, the data prediction apparatus 230 is further configured to determine the detection data $X_i$ of the i-th cycle as the actual detection data of the i-th cycle.

Figure 4:
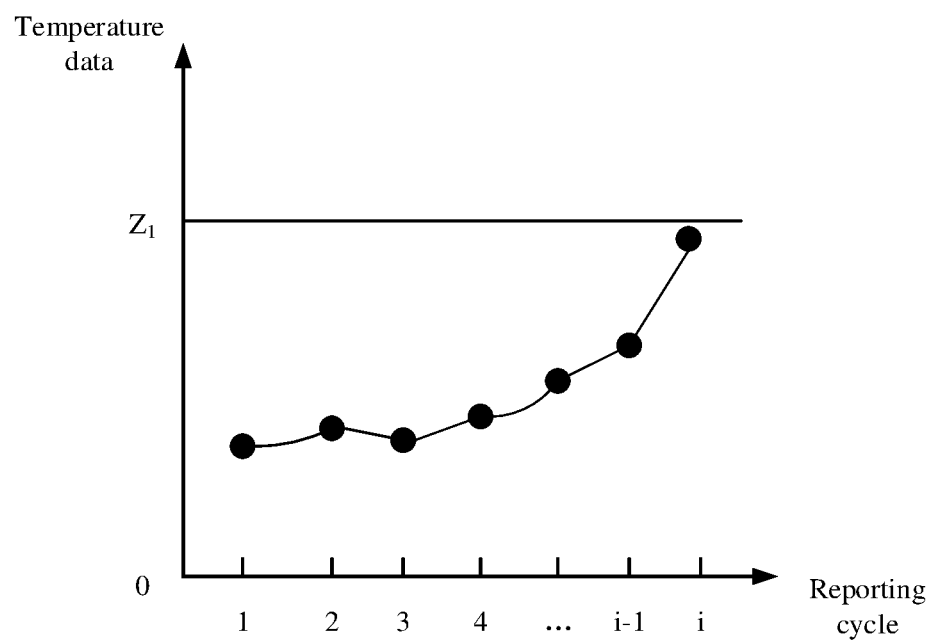
FIG. 4 is a schematic diagram of a fitted temperature curve provided by an embodiment of the present application.

The fire-protection host of the container-type energy storage device 240 is configured to periodically read the detection data sent by the data prediction apparatus 230 and analyze the detection data from the (i−k)-th cycle to the i-th cycle to determine whether a potential thermal runaway exists in battery packs in the plurality of battery clusters 210, and to execute a predetermined fire-protection strategy if the potential thermal runaway exists in the battery packs in the plurality of battery clusters 210. Specifically, the fire-protection host of the container-type energy storage device 240 extracts temperature data from the detection data from the (i−k)-th cycle to the i-th cycle, and fits a temperature curve of the battery packs in a coordinate system with the reporting cycle as the horizontal coordinate and the temperature data as the vertical coordinate, which may be specifically shown in FIG. 4. If the incremental value of the temperature data of consecutive multiple cycles prior to the i-th cycle increases linearly, and the difference between the temperature data of the i-th cycle and the characteristic temperature $Z_1$ of thermal runaway is less than a temperature threshold, then the fire-protection host of the container-type energy storage device 240 determines that there is a potential thermal runaway in the corresponding battery pack.

The temperature threshold is $$\frac{Z_2 - Z_1}{3},$$

where $Z_1$ denotes a first characteristic temperature of the thermal runaway of the battery, i.e., the self-generated heat temperature of battery, and $Z_2$ denotes a second characteristic temperature of the thermal runaway of the battery, i.e., the initiation temperature of the thermal runaway.

In terms of executing the preset fire-protection strategy, the fire-protection host of the container-type energy storage device 240 is specifically configured to: execute a package-level fire-protection strategy when only one battery pack of one battery cluster 210 among the plurality of the battery clusters 210 has potential runaway, i.e., execute a series of operations such as alerting, initiating spraying, isolating, etc., only for this battery pack; execute a cluster-level fire-protection strategy when the number of battery clusters 210 with potential thermal runaway among the plurality of battery clusters 210 is greater than or equal to a first threshold and less than or equal to a second threshold, i.e., execute a series of operations such as alerting, initiating spraying, isolating, etc., only for this cluster with potential thermal runaway; and execute a container-level fire-protection strategy when the number of battery clusters 210 with potential thermal runaway among the plurality of battery clusters 210 is greater than or equal to the second threshold, i.e., execute a series of operations such as executing alarm, starting full flooding spraying, and turning on the fan, etc. to the entire container-type energy storage device. The first threshold and the second threshold may be set based on experience. The alarm level of the package-level fire-protection strategy is lower than the alarm level of the cluster-level fire-protection strategy, and the alarm level of the cluster-level fire-protection strategy is lower than the alarm level of the container-level fire-protection strategy.

Optionally, the fire-protection host of the container-type energy storage device 240 is further configured to: train and update the prediction model based on the data sent by the data prediction apparatus 230 in each cycle, and send the updated prediction model and the version number of this prediction model to the data prediction apparatus 230, so that the data prediction apparatus 230 obtains the model prediction data of the next cycle through the prediction model. Since the fire-protection host of the container-type energy storage device 240 in the embodiments of the present application updates the prediction model in each cycle, the model parameters of the prediction model in each cycle will be different, and the version numbers of the prediction models will also be different. The fire-protection host of the container-type energy storage device 240 sends each version of the prediction model with its version number to the data prediction apparatus 230.

Optionally, the data prediction apparatus 230 is also configured to: send the model prediction data of the cycle and the version number of the prediction model to the fire-protection host of the container-type energy storage device 240 in each cycle, where the version number is the version number of the prediction model deployed in the data prediction apparatus 230, and the version number is sent to the data prediction apparatus 230 along with the prediction model when the prediction model is trained by the fire-protection host of the container-type energy storage device 240.

Optionally, the fire-protection host of the container-type energy storage device 240 is further configured to:
periodically read the model prediction data and the version number sent by the data prediction apparatus 230;
determine a target prediction model from a plurality of stored prediction models based on the version number;
obtain an average absolute error loss of the target prediction model based on the model prediction data and the actual detection data of each cycle;
obtain a mean square error loss of the target prediction model based on the cycle prediction error of each cycle;
adjust the target prediction model according to the average absolute error loss and the mean square error loss to obtain an updated prediction model, and generate an updated version number of the updated prediction model; and
send the updated prediction model and the updated version number to the data prediction apparatus 230.

Specifically, in each cycle, in addition to reading the detection data sent by the data prediction apparatus 230, the fire-protection host of the container-type energy storage device 240 also reads the model prediction data and the version number sent by the data prediction apparatus 230. The fire-protection host of the container-type energy storage device 240 stores each version of the prediction model and a version number corresponding to each version. The fire-protection host of the container-type energy storage device 240 may obtain a target prediction model from a plurality of versions of the stored prediction model by matching the version number, and the target prediction model is the prediction model deployed on the data prediction apparatus 230. For each cycle, the fire-protection host of the container-type energy storage device 240 calculates the average absolute error loss of the target prediction model by using the model prediction data and the actual detection data of the data prediction apparatus 230, which may be represented as the following formula (6):

$$\frac{1}{6}\sum\nolimits_{s=1}^{6}|x_s - x'_s|, \tag{6}$$

where s represents the s-th element in the temperature, humidity, smoke, combustible gas, water immersion, and lithium ion particles data, $x_s$ represents the actual detection data of the s-th element, and $x_s'$ represents the model prediction data of the s-th element.

The fire-protection host of the container-type energy storage device 240 obtains the mean square error loss of the target prediction model based on the cycle prediction error of each cycle, which may be represented as the following formula (7):

$$\frac{1}{6}\sum\nolimits_{p=1}^{6} \text{ERROR}_p^2, \tag{7}$$

where ERROR represents the cycle prediction error of the prediction model for each detector module 220, p represents the p-th element in the cycle prediction error ERROR. The fire-protection host of the container-type energy storage device 240 obtains a final loss by performing a weighted summation of the average absolute error loss and the mean square error loss. In the case that the final loss is less than a threshold, the model parameters of the target prediction model are updated by using the back propagation algorithm, so that an updated prediction model is obtained, and the corresponding version number (i.e., the updated version number) is generated. The updated prediction model and the updated version number are then sent to the data prediction apparatus 230.

In this implementation manner, the fire-protection host of the container-type energy storage device 240 obtains the loss of the prediction model by using the model prediction data and the actual detection data in each cycle to update the prediction model, and deliver the updated prediction model to the data prediction apparatus 230, so as to improve the accuracy of the data prediction apparatus 230 in obtaining the detection data by using the prediction model in the event that the detection data cannot be read. In addition, the update of the prediction model is performed at the side of the fire-protection host of the container-type energy storage device 240, which helps to reduce the load of the data prediction apparatus 230 and reduce the loss of the data prediction apparatus 230.

Optionally, the data prediction apparatus 230 is further configured to:

receive the updated prediction model and the updated version number sent by the fire-protection host of the container-type energy storage device 240; and replace the prediction model with the updated prediction model, and record an association relationship between the updated prediction model and the updated version number.

In this implementation manner, the data prediction apparatus 230 replaces the prediction model with an updated prediction model in each cycle, which facilitates obtaining the detection data by using the updated prediction model when the detection data cannot be read, so as to improve the accuracy of prediction.

Optionally, the data prediction apparatus 230 is further configured to:

if a target detector module with a cumulative prediction error being greater than or equal to a prediction error threshold exists in the at least one detector module 220, send a reset request to the fire-protection host of the container-type energy storage device 240, where the reset request includes a device identification of the target detector module, and the reset request is used to request the fire-protection host of the container-type energy storage device to reset the target detector module based on the device identification.

Specifically, since the prediction model in the data prediction apparatus 230 is updated every cycle, the data prediction apparatus 230 has a relatively high level of confidence in the prediction accuracy of the prediction model. When the cumulative prediction error of a No. 1 detector module 220 is greater than or equal to a prediction error threshold, the data prediction apparatus 230 may consider that the No. 1 detector module 220 has a certain cumulative detection error of its own, and determine the No. 1 detector module 220 as the target detector module, and send the device identification of the No. 1 detector module 220 to the fire-protection host of the container-type energy storage device 240 to request the fire-protection host of the container-type energy storage device 240 to reset the No. 1 detector module 220. In this implementation manner, when the cumulative prediction error of a certain detector module 220 is greater than or equal to the prediction error threshold, the data prediction apparatus 230 requests the fire-protection host 240 of the container-type energy storage device to reset this detector module 220 so as to improve its detection accuracy.

It can be seen that in the embodiments of the present application, the data prediction apparatus 230 is communicatively connected to the at least one detector module and the fire-protection host of the container-type energy storage device 240, respectively. In the case that the communication link is normal, the data prediction apparatus 230 may forward the detection data periodically reported by the at least one detector module 220 to the fire-protection host of the container-type energy storage device 240, and the original communication mode between the at least one detector module 220 and the fire-protection host of the container-type energy storage device 240 is not affected. In the case that the communication link is abnormal, the data prediction apparatus 230 may obtain the detection data of the current cycle through the prediction model by using the actual detection data of the historical cycles of the current cycle, and send the detection data to the fire-protection host of the container-type energy storage device 240 to ensure that data can be continuously provided to the fire-protection host of the container-type energy storage device 240, thereby improving the reliability of fire-protection communication. And the fire-protection host of the container-type energy storage device 240 executes the fire-protection strategy to avoid the occurrence of thermal runaway when there is a potential thermal runaway in battery packs in the plurality of battery clusters 210. In addition, the data prediction apparatus 230 may determine a cycle prediction error of the prediction model for each detector module 220 by using the actual detection data and model prediction data of the historical cycles, and can correct the model prediction data in the current cycle by using the cycle prediction error, which is beneficial for improving the accuracy of obtaining detection data of the current cycle.

Figure 5:
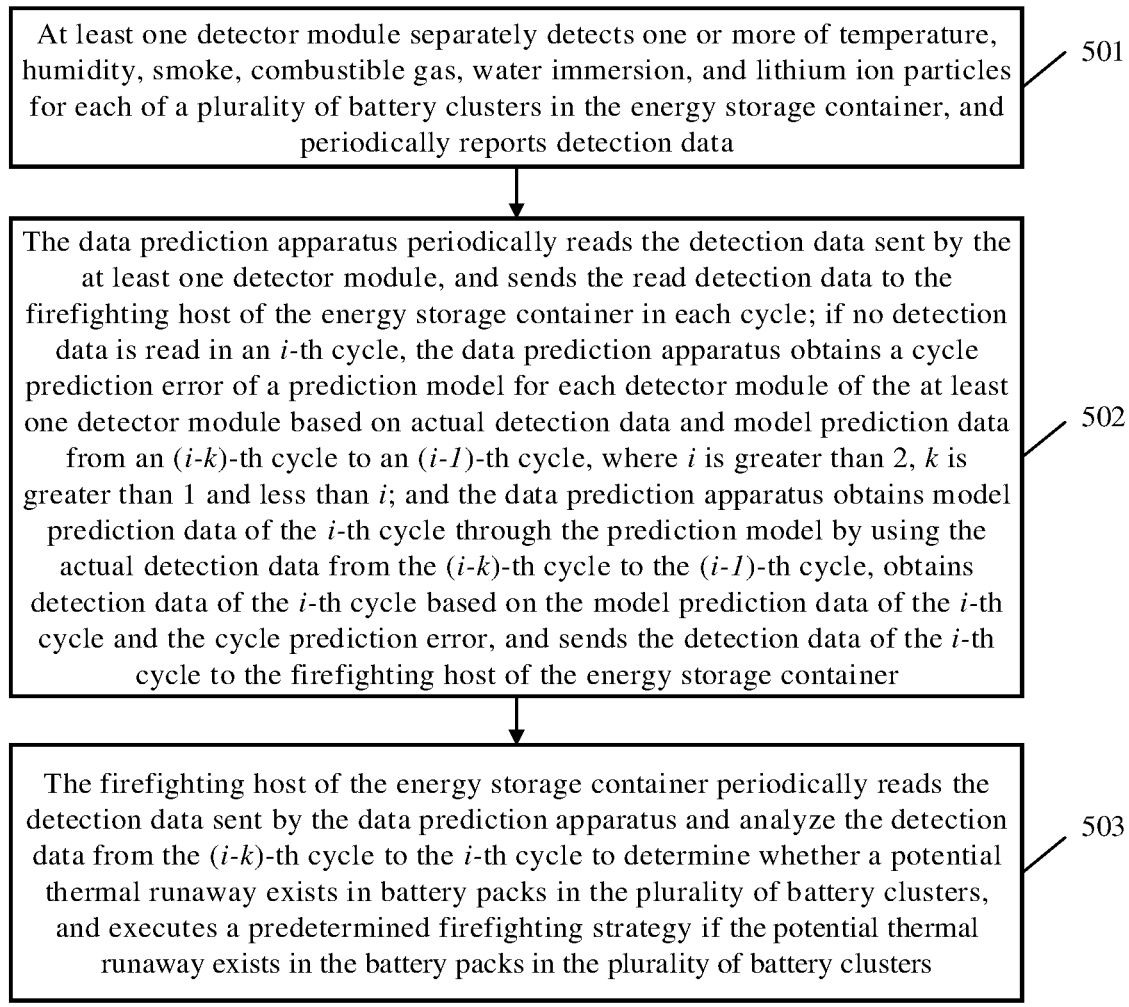
FIG. 5 is a schematic flowchart of a fire-protection method for a container-type energy storage device provided by an embodiment of the present application.

Based on the description of the above system embodiment, an embodiment of the present application further provides a fire-protection method for a container-type energy storage device. Referring to FIG. 5, which is a schematic flowchart of a fire-protection method for a container-type energy storage device provided by an embodiment of the present application, the method may be applied to a fire-protection system, where the fire-protection system includes at least one detector module, a data prediction apparatus and a fire-protection host of the container-type energy storage device, and the data prediction apparatus is communicatively connected to the at least one detector module and the fire-protection host of the container-type energy storage device, respectively. As shown in FIG. 5, the method includes steps 501-503.

In step 501, the at least one detector module separately detects one or more of temperature, humidity, smoke, combustible gas, water immersion, and lithium ion particles for each of a plurality of battery clusters in the container-type energy storage device, and periodically reports detection data.

In step 502, the data prediction apparatus periodically reads the detection data sent by the at least one detector module, and sends the read detection data to the fire-protection host of the container-type energy storage device in each cycle; if no detection data is read in an i-th cycle, the data prediction apparatus obtains a cycle prediction error of a prediction model for each detector module of the at least one detector module based on actual detection data and model prediction data from an (i−k)-th cycle to an (i−1)-th cycle, where i is greater than 2, k is greater than 1 and less than i; and the data prediction apparatus obtains model prediction data of the i-th cycle through the prediction model by using the actual detection data from the (i−k)-th cycle to the (i−1)-th cycle, obtains detection data of the i-th cycle based on the model prediction data of the i-th cycle and the cycle prediction error, and sends the detection data of the i-th cycle to the fire-protection host of the container-type energy storage device.

In step 503, the fire-protection host of the container-type energy storage device periodically reads the detection data sent by the data prediction apparatus and analyze the detection data from the (i−k)-th cycle to the i-th cycle to determine whether a potential thermal runaway exists in battery packs in the plurality of battery clusters, and executes a predetermined fire-protection strategy if the potential thermal runaway exists in battery packs in the plurality of battery clusters.

It can be seen that in the embodiments of the present application, the data prediction apparatus is communicatively connected to the at least one detector module and the fire-protection host of the container-type energy storage device, respectively. In the case that the communication link is normal, the data prediction apparatus may forward the detection data periodically reported by the at least one detector module to the fire-protection host of the container-type energy storage device, and the original communication mode between the at least one detector module and the fire-protection host of the container-type energy storage device is not affected. In the case that the communication link is abnormal, the data prediction apparatus may obtain the detection data of the current cycle through the prediction model by using the actual detection data of the historical cycles of the current cycle, and send the detection data to the fire-protection host of the container-type energy storage device to ensure that data can be continuously provided to the fire-protection host of the container-type energy storage device, thereby improving the reliability of fire-protection communication. And the fire-protection host of the container-type energy storage device executes the fire-protection strategy to avoid the occurrence of thermal runaway when there is a potential thermal runaway in battery packs in the plurality of battery clusters. In addition, the data prediction apparatus may determine a cycle prediction error of the prediction model for each detector module by using the actual detection data and model prediction data of the historical cycles, and correct the model prediction data in the current cycle by using the cycle prediction error, which is beneficial for improving the accuracy of obtaining detection data of the current cycle.

In some possible implementation manners, the obtaining the cycle prediction error of the prediction model for each detector module of the at least one detector module based on the actual detection data and the model prediction data from the (i−k)-th cycle to the (i−1)-th cycle, includes:

obtaining a cumulative prediction error of the prediction model for each detector module based on the actual detection data and the model prediction data from the (i−k)-th cycle to the (i−1)-th cycle;

obtaining a cumulative reporting time error of each detector module based on moments when the actual detection data is read from the (i−k)-th cycle to the (i−1)-th cycle; and obtaining the cycle prediction error based on the cumulative prediction error and the cumulative reporting time error.

In some possible implementation manners, the obtaining the cumulative prediction error of the prediction model for each detector module based on the actual detection data and the model prediction data from the (i−k)-th cycle to the (i−1)-th cycle, includes:

obtaining a prediction error of the prediction model for each detector module in each cycle from the (i−k)-th cycle to the (i−1)-th cycle according to the actual detection data of each detector module in each cycle from the (i−k)-th cycle to the (i−1)-th cycle and the model prediction data; and obtaining the cumulative prediction error according to the prediction error of each detector module in each cycle from the (i−k)-th cycle to the (i−1)-th cycle.

In some implementation manners, the obtaining the cumulative reporting time error of each detector module based on moments when the actual detection data is read from the (i−k)-th cycle to the (i−1)-th cycle, includes:

for every two adjacent cycles from the (i−k)-th cycle to the (i−1)-th cycle, obtaining a reporting time error of each detector module in every two adjacent cycles based on the moments when the actual detection data of every two adjacent cycles is read; and obtaining the cumulative reporting time error according to the reporting time error of each detector module in every two adjacent cycles; and the obtaining the cycle prediction error based on the cumulative prediction error and the cumulative reporting time error, includes:

calculating a unit time prediction error of the prediction model for each detector module by using the cumulative prediction error and the cumulative reporting time error; and obtaining the cycle prediction error based on the unit time prediction error and a preset duration of cycle interval.

In some possible implementation manners, the method further includes:

obtaining the model prediction data of each cycle through the prediction model by using the actual detection data of a plurality of historical cycles of each cycle, and in each cycle, sending the model prediction data of this cycle and a version number of the prediction model to the fire-protection host of the container-type energy storage device, by the data prediction apparatus, where the version number is sent to the data prediction apparatus along with the prediction model by the fire-protection host of the container-type energy storage device when the prediction model is trained.

In some possible implementation manners, the method further includes:

periodically reading the model prediction data and the version number sent by the data prediction apparatus by the fire-protection host of the container-type energy storage device;

determining a target prediction model from a plurality of stored prediction models based on the version number by the fire-protection host of the container-type energy storage device;

obtaining an average absolute error loss of the target prediction model based on the model prediction data and the actual detection data of each cycle by the fire-protection host of the container-type energy storage device;

obtaining a mean square error loss of the target prediction model based on the cycle prediction error of each cycle by the fire-protection host of the container-type energy storage device;

adjusting the target prediction model according to the average absolute error loss and the mean square error loss to obtain an updated prediction model, and generating an updated version number of the updated prediction model, by the fire-protection host of the container-type energy storage device; and sending the updated prediction model and the updated version number to the data prediction apparatus by the fire-protection host of the container-type energy storage device.

In some possible implementation manners, the method further includes:

receiving, by the data prediction apparatus, the updated prediction model and the updated version number sent by the fire-protection host of the container-type energy storage device; and replacing the prediction model with the updated prediction model, and recording an association relationship between the updated prediction model and the updated version number by the data prediction apparatus.

In some possible implementation manners, the method further includes:

if a target detector module with a cumulative prediction error being greater than or equal to a prediction error threshold exists in the at least one detector module, sending, by the data prediction apparatus, a reset request to the fire-protection host of the container-type energy storage device, where the reset request includes a device identification of the target detector module, and the reset request is used to request the fire-protection host of the container-type energy storage device to reset the target detector module based on the device identification.

It can be seen that in the embodiments of the present application, the data prediction apparatus is communicatively connected to the at least one detector module and the fire-protection host of the container-type energy storage device, respectively. In the case that the communication link is normal, the data prediction apparatus can forward the detection data periodically reported by the at least one detector module to the fire-protection host of the container-type energy storage device, and the original communication mode between the at least one detector module and the fire-protection host of the container-type energy storage device is not affected. In the case that the communication link is abnormal, the data prediction apparatus can obtain the detection data of the current cycle through the prediction model by using the actual detection data of the historical cycles of the current cycle, and send the detection data to the fire-protection host of the container-type energy storage device to ensure that data can be continuously provided to the fire-protection host of the container-type energy storage device, thereby improving the reliability of fire-protection communication. And the fire-protection host of the container-type energy storage device executes the fire-protection strategy to avoid the occurrence of thermal runaway when there is a potential thermal runaway in battery packs in the plurality of battery clusters. In addition, the data prediction apparatus can determine a cycle prediction error of the prediction model for each detector module by using the actual detection data and model prediction data of the historical cycles, and the model prediction data in the current cycle can be corrected by using the cycle prediction error, which is beneficial for improving the accuracy of obtaining the detection data of the current cycle.

In some possible implementation manners, in terms of obtaining the cycle prediction error of the prediction model for each detector module of the at least one detector module based on the actual detection data and the model prediction data from the (i–k)-th cycle to the (i–1)-th cycle, the data prediction apparatus is specifically configured to:

obtain a cumulative prediction error of the prediction model for each detector module based on the actual detection data and the model prediction data from the (i–k)-th cycle to the (i–1)-th cycle;

obtain a cumulative reporting time error of each detector module based on moments when the actual detection data is read from the (i–k)-th cycle to the (i–1)-th cycle; and obtain the cycle prediction error based on the cumulative prediction error and the cumulative reporting time error.

In this implementation manner, the data prediction apparatus can obtain the cumulative prediction error of the prediction model for each detector module through the actual detection data and the model prediction data of each cycle from the (i–k)-th cycle to the (i–1)-th cycle, and can obtain the cumulative reporting time error of each detector module through the moments when the actual detection data of each detector module is read in each cycle, thereby calculating and obtaining the cycle prediction error of the prediction model for each detector module and correcting the prediction data of the prediction model by using the cycle prediction error.

In some possible implementation manners, in terms of obtaining the cumulative prediction error of the prediction model for each detector module based on the actual detection data and the model prediction data from the (i−k)-th cycle to the (i−1)-th cycle, the data prediction apparatus is specifically configured to:

obtain a prediction error of the prediction model for each detector module in each cycle from the (i−k)-th cycle to the (i−1)-th cycle according to the actual detection data of each detector module in each cycle from the (i−k)-th cycle to the (i−1)-th cycle and the model prediction data; and obtain the cumulative prediction error according to the prediction error of each detector module in each cycle from the (i−k)-th cycle to the (i−1)-th cycle.

In this implementation manner, the data prediction apparatus calculates the cumulative prediction error of the prediction model for each detector model through the actual detection data and the model prediction data in each cycle from the (i−k)-th cycle to the (i−1)-th cycle, which is conducive to obtaining a unit time prediction error of the prediction model for each detector module subsequently, and correcting the prediction value of the prediction model by using the unit time prediction error to improve the accuracy of the detection data reported by the data prediction apparatus in the i-th cycle.

In some possible implementation manners, in terms of obtaining the cumulative reporting time error of each detector module based on moments when the actual detection data is read from the (i−k)-th cycle to the (i−1)-th cycle, the data prediction apparatus is specifically configured to:

for every two adjacent cycles from the (i−k)-th cycle to the (i−1)-th cycle, obtain a reporting time error of each detector module in every two adjacent cycles based on the moments when the actual detection data of every two adjacent cycles is read; and obtain the cumulative reporting time error according to the reporting time error of each detector module in every two adjacent cycles;

in terms of obtaining the cycle prediction error based on the cumulative prediction error and the cumulative reporting time error, the data prediction apparatus is specifically configured to:

calculate a unit time prediction error of the prediction model for each detector module by using the cumulative prediction error and the cumulative reporting time error; and obtain the cycle prediction error based on the unit time prediction error and a preset duration of cycle interval.

In this implementation manner, the data prediction apparatus obtains the reporting time error of each detector module in every two adjacent cycles based on the moments when the actual detection data of every two adjacent cycles is read, and then calculates the cumulative reporting time error of each detector module from the (i−k)-th cycle to the (i−1)-th cycle, which is conductive to obtaining the unit time prediction error of the prediction model for each detector module subsequently by using the above cumulative reporting time error and the above cumulative prediction error. And the cycle prediction error of the prediction model for each detector module in the i-th cycle is obtained by using the unit time prediction error and the duration of cycle interval, and then the subsequent model prediction data is corrected by using the cycle prediction error.

In some possible implementation manners, the data prediction apparatus is further configured to:

obtain the model prediction data of each cycle through the prediction model by using the actual detection data of a plurality of historical cycles of each cycle, and in each cycle, send the model prediction data of this cycle and a version number of the prediction model to the fire-protection host of the container-type energy storage device, where the version number is sent to the data prediction apparatus along with the prediction model by the fire-protection host of the container-type energy storage device in response to that the prediction model is trained.

In this implementation manner, in each cycle, the data prediction apparatus uses the actual detection data of the historical cycles of the cycle to obtain the model prediction data of this cycle through the prediction model, which is conducive to analyzing the prediction error by using the model prediction data, and is conducive for the fire-protection host of the container-type energy storage device to update the weight parameter, the bias parameter, etc., of the prediction model by using the model prediction data and the version number in each cycle, so as to improve the prediction accuracy of the prediction model in the next cycle.

In some possible implementation manners, the fire-protection host of the container-type energy storage device is further configured to:

periodically read the model prediction data and the version number sent by the data prediction apparatus;

determine a target prediction model from a plurality of stored prediction models based on the version number;

obtain an average absolute error loss of the target prediction model based on the model prediction data and the actual detection data of each cycle;

obtain a mean square error loss of the target prediction model based on the cycle prediction error of each cycle;

adjust the target prediction model according to the average absolute error loss and the mean square error loss to obtain an updated prediction model, and generate an updated version number of the updated prediction model; and send the updated prediction model and the updated version number to the data prediction apparatus.

In this implementation manner, the fire-protection host of the container-type energy storage device obtains the loss of the prediction model by using the model prediction data and the actual detection data in each cycle to update the prediction model, and the updated prediction model is delivered to the data prediction apparatus to improve the accuracy of the data prediction apparatus in obtaining the detection data by using the prediction model in the event that the detection data cannot be read. In addition, the update of the prediction model is performed at the side of the fire-protection host of the container-type energy storage device, which helps to reduce the load of the data prediction apparatus and reduce the loss of the data prediction apparatus.

In some possible implementation manners, the data prediction apparatus is further configured to:

receive the updated prediction model and the updated version number sent by the fire-protection host of the container-type energy storage device; and replace the prediction model with the updated prediction model, and record an association relationship between the updated prediction model and the updated version number.

In this implementation manner, the data prediction apparatus replaces the prediction model with the updated prediction model in each cycle, which facilitates obtaining the detection data by using the updated prediction model when the detection data cannot be read, so as to improve the accuracy of prediction.

In some possible implementation manners, the data prediction apparatus is further configured to:
  in response to that a target detector module with a cumulative prediction error being greater than or equal to a prediction error threshold exists in the at least one detector module, send a reset request to the fire-protection host of the container-type energy storage device, where the reset request includes a device identification of the target detector module, and the reset request is used to request the fire-protection host of the container-type energy storage device to reset the target detector module based on the device identification.

In some possible implementation manners, the obtaining the cycle prediction error of the prediction model for each detector module of the at least one detector module based on the actual detection data and the model prediction data from the (i−k)-th cycle to the (i−1)-th, includes:
  obtaining a cumulative prediction error of the prediction model for each detector module based on the actual detection data and the model prediction data from the (i−k)-th cycle to the (i−1)-th cycle;
  obtaining a cumulative reporting time error of each detector module based on moments when the actual detection data is read from the (i−k)-th cycle to the (i−1)-th cycle; and
  obtaining the cycle prediction error based on the cumulative prediction error and the cumulative reporting time error.

In some possible implementation manners, the obtaining the cumulative prediction error of the prediction model for each detector module based on the actual detection data and the model prediction data from the (i−k)-th cycle to the (i−1)-th cycle, includes:
  obtaining a prediction error of the prediction model for each detector module in each cycle from the (i−k)-th cycle to the (i−1)-th cycle according to the actual detection data of each detector module in each cycle from the (i−k)-th cycle to the (i−1)-th cycle and the model prediction data; and
  obtaining the cumulative prediction error according to the prediction error of each detector module in each cycle from the (i−k)-th cycle to the (i−1)-th cycle.

In some implementation manners, the obtaining the cumulative reporting time error of each detector module based on moments when the actual detection data is read from the (i−k)-th cycle to the (i−1)-th cycle, includes:
  for every two adjacent cycles from the (i−k)-th cycle to the (i−1)-th cycle, obtaining a reporting time error of each detector module in every two adjacent cycles based on the moments when the actual detection data of every two adjacent cycles is read; and
  obtaining the cumulative reporting time error according to the reporting time error of each detector module in every two adjacent cycles; and
  the obtaining the cycle prediction error based on the cumulative prediction error and the cumulative reporting time error, includes:
  calculating a unit time prediction error of the prediction model for each detector module by using the cumulative prediction error and the cumulative reporting time error; and
  obtaining the cycle prediction error based on the unit time prediction error and a preset duration of cycle interval.

In some possible implementation manners, the method further includes:
  obtaining the model prediction data of each cycle through the prediction model by using the actual detection data of a plurality of historical cycles of each cycle, and in each cycle, sending the model prediction data of this cycle and a version number of the prediction model to the fire-protection host of the container-type energy storage device, by the data prediction apparatus, where the version number is sent to the data prediction apparatus along with the prediction model by the fire-protection host of the container-type energy storage device in response to that the prediction model is trained.

In some possible implementation manners, the method further includes:
  periodically reading the model prediction data and the version number sent by the data prediction apparatus by the fire-protection host of the container-type energy storage device;
  determining a target prediction model from a plurality of stored prediction models based on the version number by the fire-protection host of the container-type energy storage device;
  obtaining an average absolute error loss of the target prediction model based on the model prediction data and the actual detection data of each cycle by the fire-protection host of the container-type energy storage device;
  obtaining a mean square error loss of the target prediction model based on the cycle prediction error of each cycle by the fire-protection host of the container-type energy storage device;
  adjusting the target prediction model according to the average absolute error loss and the mean square error loss to obtain an updated prediction model, and generating an updated version number of the updated prediction model, by the fire-protection host of the container-type energy storage device; and
  sending the updated prediction model and the updated version number to the data prediction apparatus by the fire-protection host of the container-type energy storage device.

In some possible implementation manners, the method further includes:
  receiving, by the data prediction apparatus, the updated prediction model and the updated version number sent by the fire-protection host of the container-type energy storage device; and
  replacing the prediction model with the updated prediction model, and recording an association relationship between the updated prediction model and the updated version number, by the data prediction apparatus.

In some possible implementation manners, the method further includes:
  in response to that a target detector module with a cumulative prediction error being greater than or equal to a prediction error threshold exists in the at least one detector module, sending, by the data prediction apparatus, a reset request to the fire-protection host of the container-type energy storage device, where the reset request includes a device identification of the target detector module, and the reset request is used to request the fire-protection host of the container-type energy storage device to reset the target detector module based on the device identification.

It should be noted that the second aspect is the method corresponding to the above-mentioned first aspect, and the specific implementation details and beneficial effects may be referred to the first aspect above.

It should be noted that the implementation of each operation may also correspond to the corresponding description with reference to the system embodiments shown in FIG. 2A to FIG. 4, and they can achieve the same or similar beneficial effects.

An embodiment of the present application further provides a computer-readable storage medium (Memory). The computer-readable storage medium is a memory device in individual apparatus devices, and is configured to store a computer program executable by a device, and when the computer program is run on the apparatus device, the method flow shown in FIG. 5 can be implemented. It should be understood that the computer-readable storage medium herein may include a built-in storage medium in individual apparatus devices, and may also include an extended storage medium supported by individual apparatus devices. The computer-readable storage medium provides a storage space that stores operating systems of individual apparatus devices. Furthermore, one or more computer programs suitable for being loaded and executed by a processor are also stored in the storage space. It should be noted that the computer-readable storage medium herein may be a high-speed random access memory (RAM) or a non-volatile memory, such as at least one disk memory. Optionally, the computer-readable storage medium may also be at least one computer-readable storage medium located away from the aforementioned processor.

An embodiment of the present application further provides a computer program product. When the computer program product is run by a device, the method flow shown in FIG. 5 is implemented.

In the above embodiments, each embodiment is described with its own emphasis. And the part of a certain embodiment that is not described in detail may refer to the relevant descriptions of other embodiments.

It should be understood that the processor mentioned in the embodiments of the present application may be a central processing unit (CPU), or other general-purpose processors, a digital signal processor (DSP), an application specific integrated circuit (ASIC), a field programmable gate array (FPGA) or other programmable logic devices, discrete gates or transistor logic devices, discrete hardware components, etc. The general-purpose processor may be a microprocessor or the processor may be any conventional processor, etc.

It should also be understood that the memory mentioned in the embodiments of the present application may be a volatile memory or non-volatile memory, or may include both the volatile memory and the non-volatile memory. The non-volatile memory may be a read-only storage memory (ROM), a programmable ROM (PROM), an EPROM, an EEPROM or a flash memory. The volatile memory may be a RAM, which is used as an external cache. By way of illustration but not limitation, many forms of RAM are available, such as a static random access memory (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM) and a direct rambus RAM (DR RAM).

It should be noted that when the processor is a general-purpose processor, DSP, ASIC, FPGA or other programmable logic device, discrete gate or transistor logic device, or discrete hardware component, the memory (memory module) is integrated in the processor.

It should be noted that the memories described herein are intended to include, but are not limited to, these and any other suitable types of memories.

It should be understood that in various embodiments of the present application, the size of the sequence numbers of the above processes does not imply the order of execution, and the order of execution of each of the processes should be determined by its function and inherent logic, and the size of the sequence numbers shall not constitute any limitation on the implementation processes of the embodiments of the present application.

In the several embodiments provided in the present application, it should be understood that the disclosed systems, apparatuses and methods may be implemented through other manners. For example, the apparatus embodiments described above are only exemplary. For example, the division of the units is only a logical function division. In actual implementation, there may be other division manners. For example, a plurality of units or components may be combined or integrated into another system, or some features may be omitted, or not implemented. On the other hand, the coupling, direct coupling or communication connection between each other shown or discussed may be through some interfaces, and the indirect coupling or communication connection between the apparatuses or units may be in electrical, mechanical or other forms.

The units described as separate components may or may not be physically separated. A component shown as a unit may or may not be a physical unit, that is, it may be located in one place, or it may be distributed over a plurality of network units. Some or all of the units may be selected according to actual needs to achieve the purpose of the solution of the present embodiment.

In addition, various functional units in various embodiments of the present application may be integrated into one processing unit, or various units may exist physically alone, or two or more units may be integrated into one unit. The integrated units described above may be stored in a computer-readable storage medium if being implemented as a software functional unit and sold or used as an independent product.

In the present application, the term "at least one" refers to one or more, and the term "a plurality of" refers to two or more. The term "and/or" describes the association relationship between associated objects, indicating that there may be three relationships. For example, A and/or B may represent the cases that A exists alone, A and B exist simultaneously, and B exists alone, where A and B may be singular or plural. In the text description of the present application, the character "/" generally indicates that the related objects are in an "or" relationship.

The steps in the methods of the embodiments of the present application may be adjusted in sequence, combined, and deleted according to actual needs.

The modules in the apparatus of the embodiments of the present application may be combined, divided, and deleted according to actual needs.

As mentioned above, the above embodiments are only used to illustrate the technical solutions of the present application, but not to limit them. Although the present application has been described in detail with reference to the foregoing embodiments, those of ordinary skill in the art should understand that they may still modify the technical solutions recorded in the foregoing embodiments, or make equivalent substitutions for some of the technical features therein. However, these modifications or substitutions do not cause the essence of the corresponding technical solutions to depart from the scope of the technical solutions of the embodiments of the present application.

What is claimed is:

1. A fire-protection system for a container-type energy storage device, wherein the system comprises at least one detector module, a data prediction apparatus and a fire-protection host of the container-type energy storage device, and the data prediction apparatus is communicatively connected to the at least one detector module and the fire-protection host of the container-type energy storage device, respectively;
   wherein the at least one detector module is configured to separately detect one or more of temperature, humidity, smoke, combustible gas, water immersion, and lithium ion particles for each of a plurality of battery clusters in the container-type energy storage device, and to periodically report detection data, wherein the at least one detector module is a sensor group comprising at least one independent sensor, or a composite sensor configured to detect a plurality of parameters, or a combination of a plurality of composite sensors with different detection types;
   wherein the data prediction apparatus is configured to periodically read the detection data sent by the at least one detector module, and to send the read detection data to the fire-protection host of the container-type energy storage device in each cycle;
   the data prediction apparatus is configured to, in response to that no detection data is read in an i-th cycle, obtain a cycle prediction error of a prediction model for each detector module of the at least one detector module based on model prediction data from an (i−k)-th cycle to an (i−1)-th cycle and actual detection data from the (i−k)-th cycle to the (i−1)-th cycle, wherein i is greater than 2, k is greater than 1 and less than i; and
   the data prediction apparatus is configured to obtain model prediction data of the i-th cycle through the prediction model by using the actual detection data from the (i−k)-th cycle to the (i−1)-th cycle, obtain detection data of the i-th cycle based on the model prediction data of the i-th cycle and the cycle prediction error, and send the detection data of the i-th cycle to the fire-protection host of the container-type energy storage device; and
   wherein the fire-protection host of the container-type energy storage device is configured to periodically read the detection data sent by the data prediction apparatus and analyze the detection data from the (i−k)-th cycle to the i-th cycle to determine whether a potential thermal runaway exists in battery packs in the plurality of battery clusters, and in response to the existence of the thermal runaway, to execute a predetermined fire-protection strategy,
   wherein in terms of obtaining the cycle prediction error of the prediction model for each detector module of the at least one detector module based on the model prediction data from the (i−k)-th cycle to the (i−1)-th cycle and the actual detection data from the (i−k)-th cycle to the (i−1)-th cycle, the data prediction apparatus is specifically configured to:
   obtain a cumulative prediction error of the prediction model for each detector module based on the model prediction data from the (i−k)-th cycle to the (i−1)-th cycle and the actual detection data from the (i−k)-th cycle to the (i−1)-th cycle;
   obtain a cumulative reporting time error of each detector module based on moments when the actual detection data is read from the (i−k)-th cycle to the (i−1)-th cycle; and
   obtain the cycle prediction error based on the cumulative prediction error and the cumulative reporting time error.

2. The system according to claim 1, wherein in terms of obtaining the cumulative prediction error of the prediction model for each detector module based on the model prediction data from the (i−k)-th cycle to the (i−1)-th cycle and the actual detection data from the (i−k)-th cycle to the (i−1)-th cycle, the data prediction apparatus is specifically configured to:
   obtain a prediction error of the prediction model for each detector module in each cycle from the (i−k)-th cycle to the (i−1)-th cycle according to the model prediction data from the (i−k)-th cycle to the (i−1)-th cycle and the actual detection data of each detector module in each cycle from the (i−k)-th cycle to the (i−1)-th cycle; and
   obtain the cumulative prediction error according to the prediction error of each detector module in each cycle from the (i−k)-th cycle to the (i−1)-th cycle.

3. The system according to claim 1, wherein in terms of obtaining the cumulative reporting time error of each detector module based on moments when the actual detection data is read from the (i−k)-th cycle to the (i−1)-th cycle, the data prediction apparatus is specifically configured to:
   for every two adjacent cycles from the (i−k)-th cycle to the (i−1)-th cycle, obtain a reporting time error of each detector module in every two adjacent cycles based on the moments when the actual detection data of every two adjacent cycles is read; and
   obtain the cumulative reporting time error according to the reporting time error of each detector module in every two adjacent cycles; and
   wherein in terms of obtaining the cycle prediction error based on the cumulative prediction error and the cumulative reporting time error, the data prediction apparatus is specifically configured to:
   calculate a unit time prediction error of the prediction model for each detector module by using the cumulative prediction error and the cumulative reporting time error; and
   obtain the cycle prediction error based on the unit time prediction error and a preset duration of cycle interval.

4. The system according to claim 1, wherein the data prediction apparatus is further configured to:
   obtain the model prediction data of each cycle through the prediction model by using the actual detection data of a plurality of historical cycles of each cycle, and in each cycle, send the model prediction data of this cycle and a version number of the prediction model to the fire-protection host of the container-type energy storage device, wherein the version number is sent to the data prediction apparatus along with the prediction model by the fire-protection host of the container-type energy storage device in response to that the prediction model is trained.

5. The system according to claim 2, wherein the data prediction apparatus is further configured to:
   obtain the model prediction data of each cycle through the prediction model by using the actual detection data of a plurality of historical cycles of each cycle, and in each cycle, send the model prediction data of this cycle and a version number of the prediction model to the fire-protection host of the container-type energy storage device, wherein the version number is sent to the data prediction apparatus along with the prediction model by the fire-protection host of the container-type energy storage device in response to that the prediction model is trained.

6. The system according to claim 3, wherein the data prediction apparatus is further configured to:
obtain the model prediction data of each cycle through the prediction model by using the actual detection data of a plurality of historical cycles of each cycle, and in each cycle, send the model prediction data of this cycle and a version number of the prediction model to the fire-protection host of the container-type energy storage device, wherein the version number is sent to the data prediction apparatus along with the prediction model by the fire-protection host of the container-type energy storage device in response to that the prediction model is trained.

7. The system according to claim 4, wherein the fire-protection host of the container-type energy storage device is further configured to:
periodically read the model prediction data and the version number sent by the data prediction apparatus;
determine a target prediction model from a plurality of stored prediction models based on the version number;
obtain an average absolute error loss of the target prediction model based on the model prediction data and the actual detection data of each cycle;
obtain a mean square error loss of the target prediction model based on the cycle prediction error of each cycle;
adjust the target prediction model according to the average absolute error loss and the mean square error loss to obtain an updated prediction model, and generate an updated version number of the updated prediction model; and
send the updated prediction model and the updated version number to the data prediction apparatus.

8. The system according to claim 5, wherein the fire-protection host of the container-type energy storage device is further configured to:
periodically read the model prediction data and the version number sent by the data prediction apparatus;
determine a target prediction model from a plurality of stored prediction models based on the version number;
obtain an average absolute error loss of the target prediction model based on the model prediction data and the actual detection data of each cycle;
obtain a mean square error loss of the target prediction model based on the cycle prediction error of each cycle;
adjust the target prediction model according to the average absolute error loss and the mean square error loss to obtain an updated prediction model, and generate an updated version number of the updated prediction model; and
send the updated prediction model and the updated version number to the data prediction apparatus.

9. The system according to claim 6, wherein the fire-protection host of the container-type energy storage device is further configured to:
periodically read the model prediction data and the version number sent by the data prediction apparatus;
determine a target prediction model from a plurality of stored prediction models based on the version number;
obtain an average absolute error loss of the target prediction model based on the model prediction data and the actual detection data of each cycle;
obtain a mean square error loss of the target prediction model based on the cycle prediction error of each cycle;
adjust the target prediction model according to the average absolute error loss and the mean square error loss to obtain an updated prediction model, and generate an updated version number of the updated prediction model; and
send the updated prediction model and the updated version number to the data prediction apparatus.

10. The system according to claim 7, wherein the data prediction apparatus is further configured to:
receive the updated prediction model and the updated version number sent by the fire-protection host of the container-type energy storage device; and
replace the prediction model with the updated prediction model, and record an association relationship between the updated prediction model and the updated version number.

11. The system according to claim 8, wherein the data prediction apparatus is further configured to:
receive the updated prediction model and the updated version number sent by the fire-protection host of the container-type energy storage device; and
replace the prediction model with the updated prediction model, and record an association relationship between the updated prediction model and the updated version number.

12. The system according to claim 9, wherein the data prediction apparatus is further configured to:
receive the updated prediction model and the updated version number sent by the fire-protection host of the container-type energy storage device; and
replace the prediction model with the updated prediction model, and record an association relationship between the updated prediction model and the updated version number.

13. The system according to claim 1, wherein the data prediction apparatus is further configured to:
in response to that a target detector module with a cumulative prediction error being greater than or equal to a prediction error threshold exists in the at least one detector module, send a reset request to the fire-protection host of the container-type energy storage device, wherein the target detector module is one of the at least one detector module, and wherein the reset request comprises a device identification of the target detector module, and the reset request is used to request the fire-protection host of the container-type energy storage device to reset the target detector module based on the device identification.

14. A fire-protection method for a container-type energy storage device, applied to a fire-protection system, wherein the fire-protection system comprises at least one detector module, a data prediction apparatus and a fire-protection host of the container-type energy storage device, and the data prediction apparatus is communicatively connected to the at least one detector module and the fire-protection host of the container-type energy storage device, respectively, and the method comprises:
separately detecting one or more of temperature, humidity, smoke, combustible gas, water immersion, and lithium ion particles for each of a plurality of battery clusters in the container-type energy storage device, and periodically reporting detection data, by the at least one detector module, wherein the at least one detector module is a sensor group comprising at least one independent sensor, or a composite sensor configured to detect a plurality of parameters, or a combination of a plurality of composite sensors with different detection types;

periodically reading the detection data sent by the at least one detector module, and sending the read detection data to the fire-protection host of the container-type energy storage device in each cycle, by the data prediction apparatus;

in response to that no detection data is read in an i-th cycle, obtaining a cycle prediction error of a prediction model for each detector module of the at least one detector module based on model prediction data from an (i−k)-th cycle to an (i−1)-th cycle and actual detection data from the (i−k)-th cycle to the (i−1)-th cycle by the data prediction apparatus, wherein i is greater than 2, k is greater than 1 and less than i; and obtaining model prediction data of the i-th cycle through the prediction model by using the actual detection data from the (i−k)-th cycle to the (i−1)-th cycle, obtaining detection data of the i-th cycle based on the model prediction data of the i-th cycle and the cycle prediction error, and sending the detection data of the i-th cycle to the fire-protection host of the container-type energy storage device, by the data prediction apparatus; and periodically reading the detection data sent by the data prediction apparatus and analyzing the detection data from the (i−k)-th cycle to the i-th cycle to determine whether a potential thermal runaway exists in battery packs in the plurality of battery clusters, and in response to the existence of the thermal runaway, executing a predetermined fire-protection strategy, by the fire-protection host of the container-type energy storage device;

wherein the obtaining the cycle prediction error of the prediction model for each detector module of the at least one detector module based on the model prediction data from the (i−k)-th cycle to the (i−1)-th cycle and the actual detection data from the (i−k)-th cycle to the (i−1)-th cycle comprises:

obtaining a cumulative prediction error of the prediction model for each detector module based on the model prediction data from the (i−k)-th cycle to the (i−1)-th cycle and the actual detection data from the (i−k)-th cycle to the (i−1)-th cycle;

obtaining a cumulative reporting time error of each detector module based on moments when the actual detection data is read from the (i−k)-th cycle to the (i−1)-th cycle; and obtaining the cycle prediction error based on the cumulative prediction error and the cumulative reporting time error.

15. A non-transitory computer-readable storage medium, applied to a fire-protection system, wherein the fire-protection system comprises at least one detector module, a data prediction apparatus and a fire-protection host of the container-type energy storage device, and the data prediction apparatus is communicatively connected to the at least one detector module and the fire-protection host of the container-type energy storage device, respectively, wherein the non-transitory computer-readable storage medium stores a computer program executable by a device, and when the computer program is executed, implements:

separately detecting one or more of temperature, humidity, smoke, combustible gas, water immersion, and lithium ion particles for each of a plurality of battery clusters in the container-type energy storage device, and periodically reporting detection data, by the at least one detector module, wherein the at least one detector module is a sensor group comprising at least one independent sensor, or a composite sensor configured to detect a plurality of parameters, or a combination of a plurality of composite sensors with different detection types;

periodically reading the detection data sent by the at least one detector module, and sending the read detection data to the fire-protection host of the container-type energy storage device in each cycle, by the data prediction apparatus;

in response to that no detection data is read in an i-th cycle, obtaining a cycle prediction error of a prediction model for each detector module of the at least one detector module based on model prediction data from an (i−k)-th cycle to an (i−1)-th cycle and actual detection data from the (i−k)-th cycle to the (i−1)-th cycle by the data prediction apparatus, wherein i is greater than 2, k is greater than 1 and less than i; and obtaining model prediction data of the i-th cycle through the prediction model by using the actual detection data from the (i−k)-th cycle to the (i−1)-th cycle, obtaining detection data of the i-th cycle based on the model prediction data of the i-th cycle and the cycle prediction error, and sending the detection data of the i-th cycle to the fire-protection host of the container-type energy storage device, by the data prediction apparatus; and periodically reading the detection data sent by the data prediction apparatus and analyzing the detection data from the (i−k)-th cycle to the i-th cycle to determine whether a potential thermal runaway exists in battery packs in the plurality of battery clusters, and in response to the existence of the thermal runaway, executing a predetermined fire-protection strategy, by the fire-protection host of the container-type energy storage device;

wherein the obtaining the cycle prediction error of the prediction model for each detector module of the at least one detector module based on the model prediction data from the (i−k)-th cycle to the (i−1)-th cycle and the actual detection data from the (i−k)-th cycle to the (i−1)-th cycle comprises:

obtaining a cumulative prediction error of the prediction model for each detector module based on the model prediction data from the (i−k)-th cycle to the (i−1)-th cycle and the actual detection data from the (i−k)-th cycle to the (i−1)-th cycle;

obtaining a cumulative reporting time error of each detector module based on moments when the actual detection data is read from the (i−k)-th cycle to the (i−1)-th cycle; and obtaining the cycle prediction error based on the cumulative prediction error and the cumulative reporting time error.

* * * * *